(12) United States Patent
Katoh et al.

(10) Patent No.: US 6,813,321 B1
(45) Date of Patent: Nov. 2, 2004

(54) DIGITAL DEMODULATOR

(75) Inventors: Hisakazu Katoh, Tokyo (JP); Akinori Hashimoto, Tokyo (JP); Yuichi Iwadate, Tokyo (JP); Kazuhiko Shibuya, Tokyo (JP); Fumiaki Minematsu, Tokyo (JP); Shigeyuki Itoh, Tokyo (JP); Tomohiro Saito, Tokyo (JP); Kenichi Shiraishi, Yokohama (JP); Akihiro Horii, Zama (JP); Shoji Matsuda, Machida (JP); Soichi Shinjo, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/582,229

(22) PCT Filed: Jan. 29, 1999

(86) PCT No.: PCT/JP99/00400

§ 371 (c)(1),
(2), (4) Date: Jul. 21, 2000

(87) PCT Pub. No.: WO99/39486

PCT Pub. Date: Aug. 5, 1999

(30) Foreign Application Priority Data

Jan. 30, 1998 (JP) .......................................... 10-032303

(51) Int. Cl.[7] ............................ H03D 3/22; H04L 27/22
(52) U.S. Cl. ...................... 375/329; 375/340; 375/326; 375/376
(58) Field of Search ................................. 375/368, 376, 375/326, 346, 316, 324, 325, 327, 331, 332, 340, 371, 375, 329; 455/3.02

(56) References Cited

U.S. PATENT DOCUMENTS 4,599,732 A * 7/1986 LeFever ...................... 375/346
4,748,623 A * 5/1988 Fujimoto ..................... 370/513
5,463,627 A * 10/1995 Matsuoka et al. ........... 370/350
6,018,556 A * 1/2000 Janesch et al. .............. 375/376
6,526,107 B1 * 2/2003 Katoh et al. ................. 375/368
6,639,951 B1 * 10/2003 Katoh et al. ................. 375/326

FOREIGN PATENT DOCUMENTS

| JP | 55-006965 | 1/1980 |
| JP | 63-234759 | 9/1988 |
| JP | 09-321813 | 12/1997 |
| JP | 10-215291 | 8/1998 |

* cited by examiner

Primary Examiner—Jean B. Corrielus
(74) Attorney, Agent, or Firm—Eric J. Robinson; Robinson Intellectual Property Law Office, P.C.

(57) ABSTRACT

A digital demodulator which will need no absolute phasing circuit is provided. A known-pattern BPSK signal generating circuit 6 generates the same known-pattern BPSK signal as a known-pattern BPSK signal in a received digital modulated wave in synchronism with the known-pattern BPSK signal in the received digital modulated wave, a carrier-reproducing phase error detecting circuit 7 has a phase error table where one of reference phases in a signal point position of a demodulation baseband signal is made a convergence point, a phase error voltage corresponding to a phase error between a phase determined from the signal point position of the demodulation baseband signals and a phase convergence point is sent out, by enable-controlling a carrier-reproducing loop filter 8 according to the known-pattern BPSK signal outputted from the known-pattern BPSK signal generating circuit 6, the phase error voltage is smoothed, and carrier reproduction is performed while controlling the frequency of a reproduced carrier according to the smoothed output so that the phase in the signal point position coincides with the phase convergence point.

2 Claims, 5 Drawing Sheets

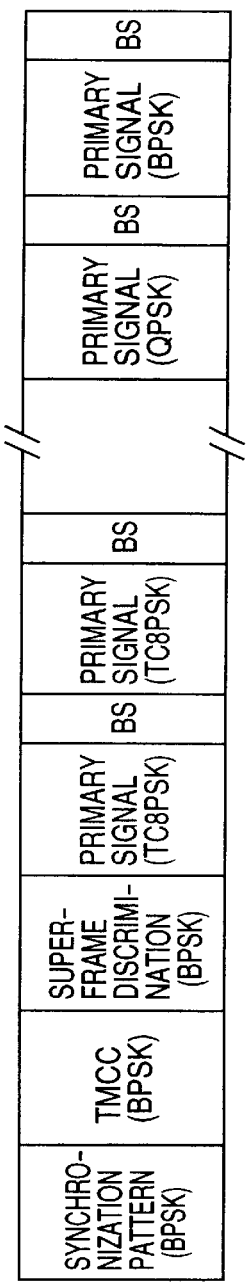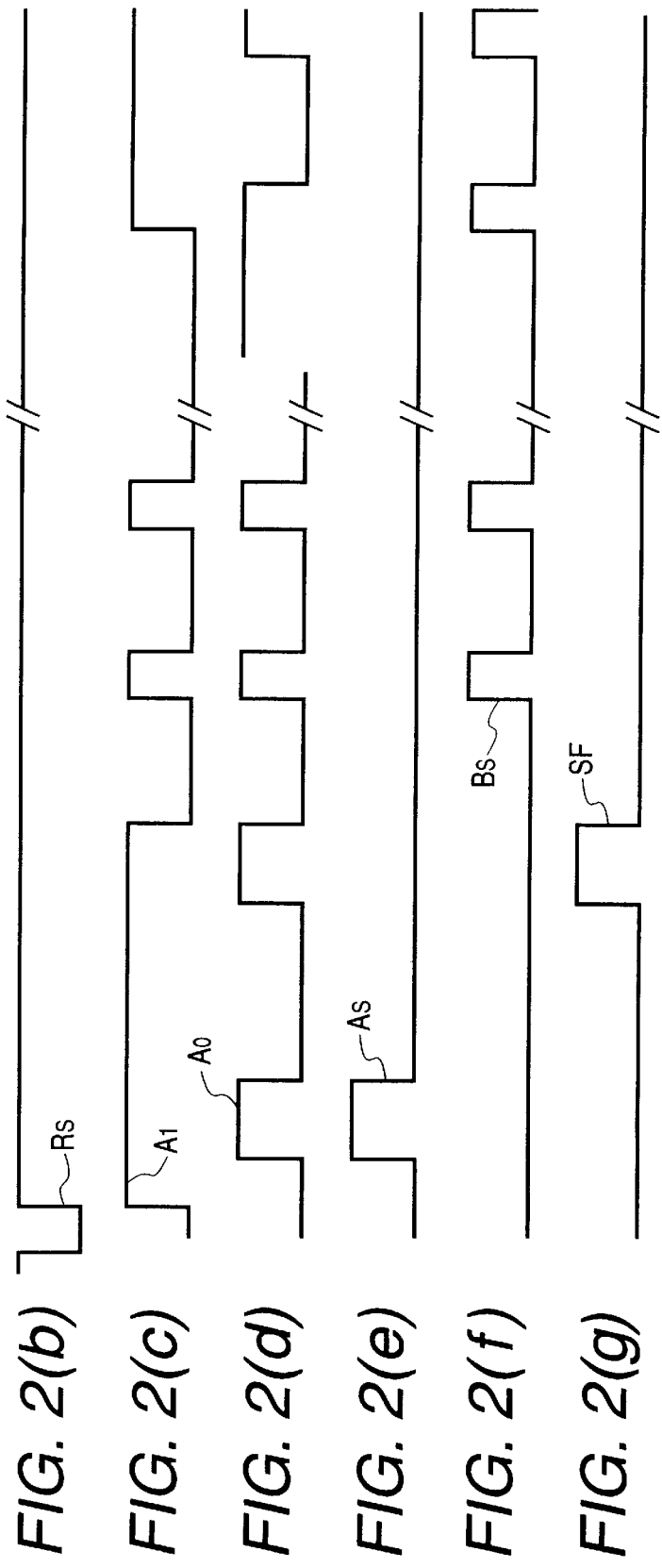

| LEADING FRAME (1) $W_1, W_2$ | SECOND FRAME (2) $W_1, W_3$ | THIRD FRAME (3) $W_1, W_3$ | FOURTH FRAME (4) $W_1, W_3$ | FIFTH FRAME (5) $W_1, W_3$ | SIXTH FRAME (6) $W_1, W_3$ | SEVENTH FRAME (7) $W_1, W_3$ | EIGHTH FRAME (8) $W_1, W_3$ |
|---|---|---|---|---|---|---|---|

DIGITAL DEMODULATOR

This application is a 371 of PCT/JP99/00400, filed on Jan. 29, 1999.

TECHNICAL FIELD

The present invention relates to a digital demodulator for a digital broadcasting receiver that receives BS digital broadcasting, and further in particular relates to a digital demodulator for a digital broadcasting receiver that receives digital modulated waves in which modulated waves as a result of a plurality of modulation systems with respectively different necessary C/N (the ratio of carrier power to noise power) values undergo time-base-multiplexing for transmission.

BACKGROUND ART

In the BS digital broadcasting system, when the digital modulated waves, for example, 8PSK modulated waves, QPSK modulated waves, and BPSK modulated waves all being the primary signals, which are transmitted in a plurality of modulation systems with different necessary C/N values, are combined every specific interval, and are added to the hierarchical transmission system in which transmission takes place repeatedly on a frame-by-frame basis, a system in which burst symbol signals enabling reception with a low C/N value are inserted is adopted. The burst symbol signals are signals having undergone BPSK modulation in the known PN codes.

Moreover, in such a hierarchical modulation system, the frame synchronization pattern as well as the superframe discrimination signals are also patterned in a predetermined fashion and have undergone BPSK modulation. In addition, in a digital broadcasting receiver, absolute phasing, which makes reception phases correspond to phases at the transmitting party, is implemented in a digital demodulator for the purpose of decoding or the like with a decoder of demodulation baseband signals. Therefore, in the hierarchical modulation system, frame synchronization signals, the later-described TMCC signals for transmission multiplexed configuration discrimination, and burst symbol signals undergo BPSK demodulation, and from the reception phases of the received frame synchronization pattern (the absolute phase reception, and the inverse phase reception), absolute phasing is performed.

However, at the time of integration of a digital demodulator, there was a problem that the required area of the digital demodulator is increased due to an absolute phasing circuit.

The purpose of the present invention is to provide a digital demodulator needing no absolute phasing circuit.

DISCLOSURE OF THE INVENTION

According to the present invention, the digital demodulator of a receiver for digital broadcasting which receives and transmits digital modulated waves created by time-base-multiplexing waves modulated by a plurality of modulation systems comprises known-pattern signal generating means for generating in synchronism with known-pattern signals in the received digital modulated waves the same known-pattern signal as a known-pattern BPSK signal in the received digital modulated waves, carrier-reproducing phase error detecting means, which comprises a phase error table having one reference phase as a convergence point between two reference phases of signal point positions of BPSK demodulation baseband signals, for sending out a phase error output based on a phase error between the phase obtained from the signal point position of the demodulation baseband signals and the phase convergence point, and a carrier-reproducing loop filter which is controlled for enablement based on the known-pattern signals outputted from the known-pattern signal generating means and smoothes the phase error outputs during an enabling period, wherein carrier reproduction is implemented by controlling the frequency of a reproduced carrier so that based on the output of the carrier-reproducing loop filter, the phase of the above described signal point position coincides with the phase convergence point.

In the digital demodulator according to the present invention, the same known-pattern signal as the known-pattern BPSK signal in the received digital modulated waves is generated in synchronism with the known-pattern BPSK signals in the received digital modulated waves from known-pattern signal generating means, the phase error output based on the phase error between the phase obtained from the signal point position of the demodulation baseband signals and the phase convergence point is detected from carrier-reproducing phase error detecting means comprising only the phase error table having one reference phase as the convergence point between the reference phases of the signal point positions of the BPSK demodulation baseband signal as the phase error table, for the purpose of phase error detection, and being enable-controlled based on the known-pattern BPSK signals outputted from the known-pattern signal generating means, the phase error outputs during the enabling period are smoothed by a carrier-reproducing loop filter, and carrier reproduction is implemented by controlling the frequency of the reproduced carrier so that based on the output of the carrier-reproducing loop filter, the phase of the above described signal point position coincides with the phase convergence point, and therefore since the phase point of the reception signal converges to the absolute phase, the reception signal undergoes absolute phasing and no absolute phasing circuit will be needed.

The digital demodulator according to the present invention goes well with only one phase error table, and for the period of such a known-pattern BPSK signal potential that will not enable the carrier-reproducing loop filter, for the period of TMCC, for the period of primary signal BPSK signal, for the period of QPSK signal, and for the period of 8PSK signal, a filter operation is halted, and therefore, the phases obtained from the signal point positions of the demodulation baseband signals for the period of such a known-pattern BPSK signal potential that will not enable the carrier-reproducing loop filter, for the period of TMCC, for the period of primary signal BPSK signal, for the period of QPSK signal, and for the period of 8PSK signal are compared with the reference phases in the phase error table so that the phase error output is sent out, but during this period the carrier-reproducing loop filter will be halting its operation, giving rise to no inconveniences.

BRIEF DESCRIPTION OF THE DRAWINGS

FIGS. 2(a)–2(g) show a block diagram of the frame of signals to be supplied to the digital demodulator according to the embodiment of the present invention and shows waveforms of the signals Rs, A1, A0, As, Bs, and SF;

FIGS. 4(a) and 4(b) are an explanatory diagram showing a superframe discrimination pattern in signal frame to be supplied to the digital demodulator according to the embodiment of the present invention.

EMBODIMENT OF THE INVENTION

The digital demodulator according to the present invention will be described by way of the embodiment as follows.

Figure 1:
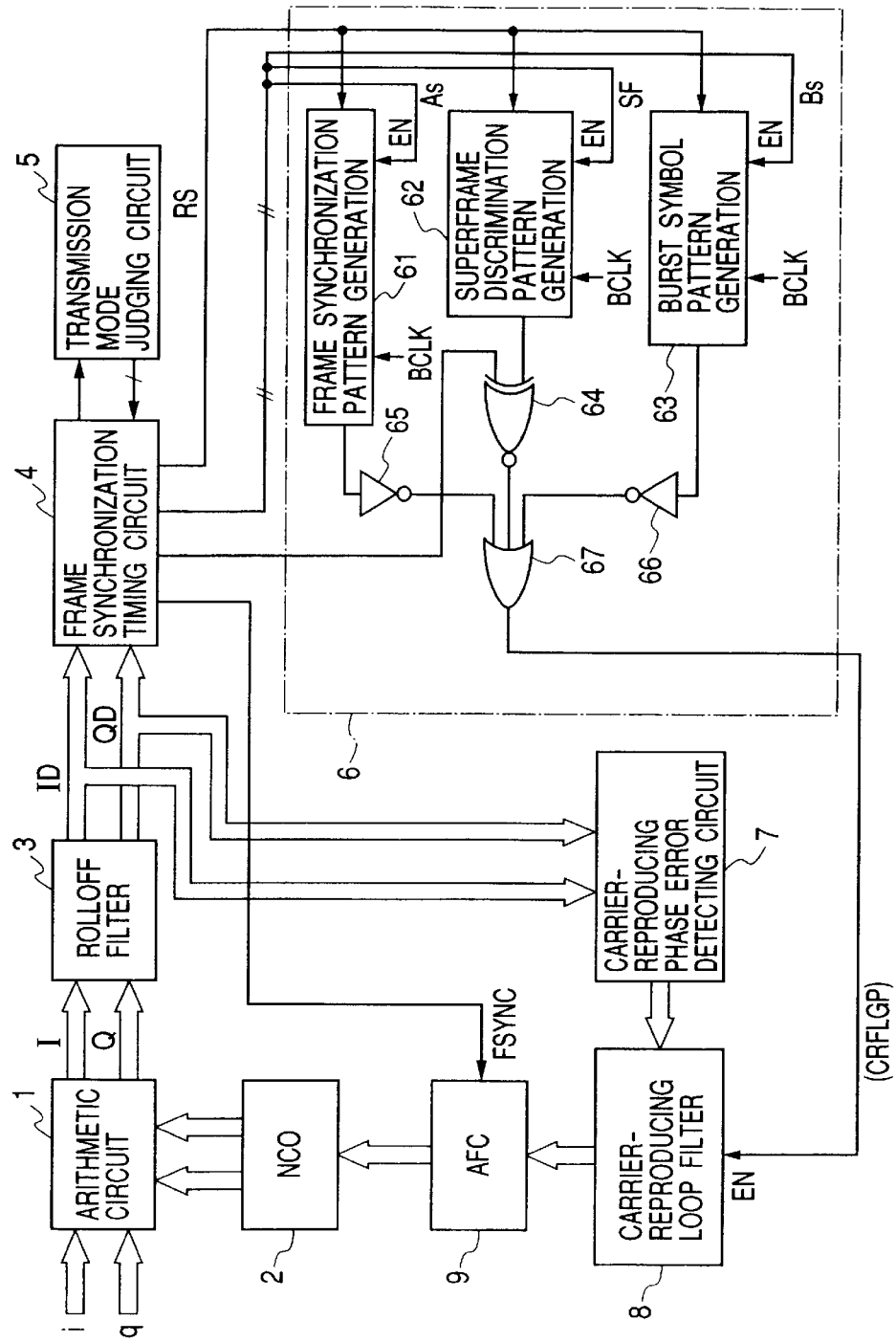
FIG. 1 is a block diagram showing the configuration of a digital demodulator according to an embodiment of the present invention.

FIG. 1 is a block diagram showing the configuration of a digital demodulator according to the embodiment of the present invention.

Prior to explanation of the digital demodulator according to the embodiment of the present invention, the frame configuration of a hierarchical modulation system will be described. FIG. 2(a) is a diagram showing an example of the frame configuration of a hierarchical modulation system. One frame is configured by one header portion 192 symbol, and 39936 symbols formed with a pair consisting of a plurality of 203 symbols and 4 symbols.

Further in particular, the frame configuration is formed in the order of frame synchronization pattern (BPSK) 32 symbols (within which predetermined 20 symbols are used) configuring a header, TMCC (Transmission and Multiplexing Configuration Control) pattern (BPSK) 128 symbols for transmission multiplexed configuration discrimination as well as superframe discrimination information pattern 32 symbols (within which predetermined 20 symbols are used), primary signals (TC8PSK) 203 symbols succeeding the header, burst symbol signals (which are indicated as BS in FIG. 2(a)) 4 symbols undergoing BPSK modulation with pseudo random signals to be set every 1 frame period, primary signals (TC8PSK) 203 symbols, burst symbol signals 4 symbols, . . . , primary signals (QPSK) 203 symbols, burst symbols signals 4 symbols, primary signals (BPSK) 203 symbols, and burst symbols signals 4 symbols. Here, 8 frames are called as a superframe, and the superframe discrimination information pattern is information for superframe discrimination.

Now, description of the digital demodulator according to the embodiment of the present invention shown in FIG. 1 will be resumed. The digital demodulator according to the embodiment of the present invention comprises an arithmetic circuit 1, a numerical control oscillator (NCO) 2, a rolloff filter 3 comprising a digital filter and showing a raised cosine characteristic, a frame synchronization timing circuit 4, a transmission mode judging circuit 5, a known-pattern signal generating circuit 6 generating the known-pattern BPSK signals in synchronism with the frame leader, a carrier-reproducing phase error detecting circuit 7 having a phase error table for carrier reproduction and sending out a phase error voltage for carrier reproduction corresponding to a demodulation baseband signal outputted from the rolloff filter 3, a carrier-reproducing loop filter 8 comprising a low bus digital filter which is selectively enabled by an output from the known-pattern signal generating circuit 6 and smoothes the phase error voltage, and an AFC circuit 9 sending out the AFC signals to the numerical control oscillator 2 based on the output from the carrier-reproducing loop filter 8.

Figure 3:
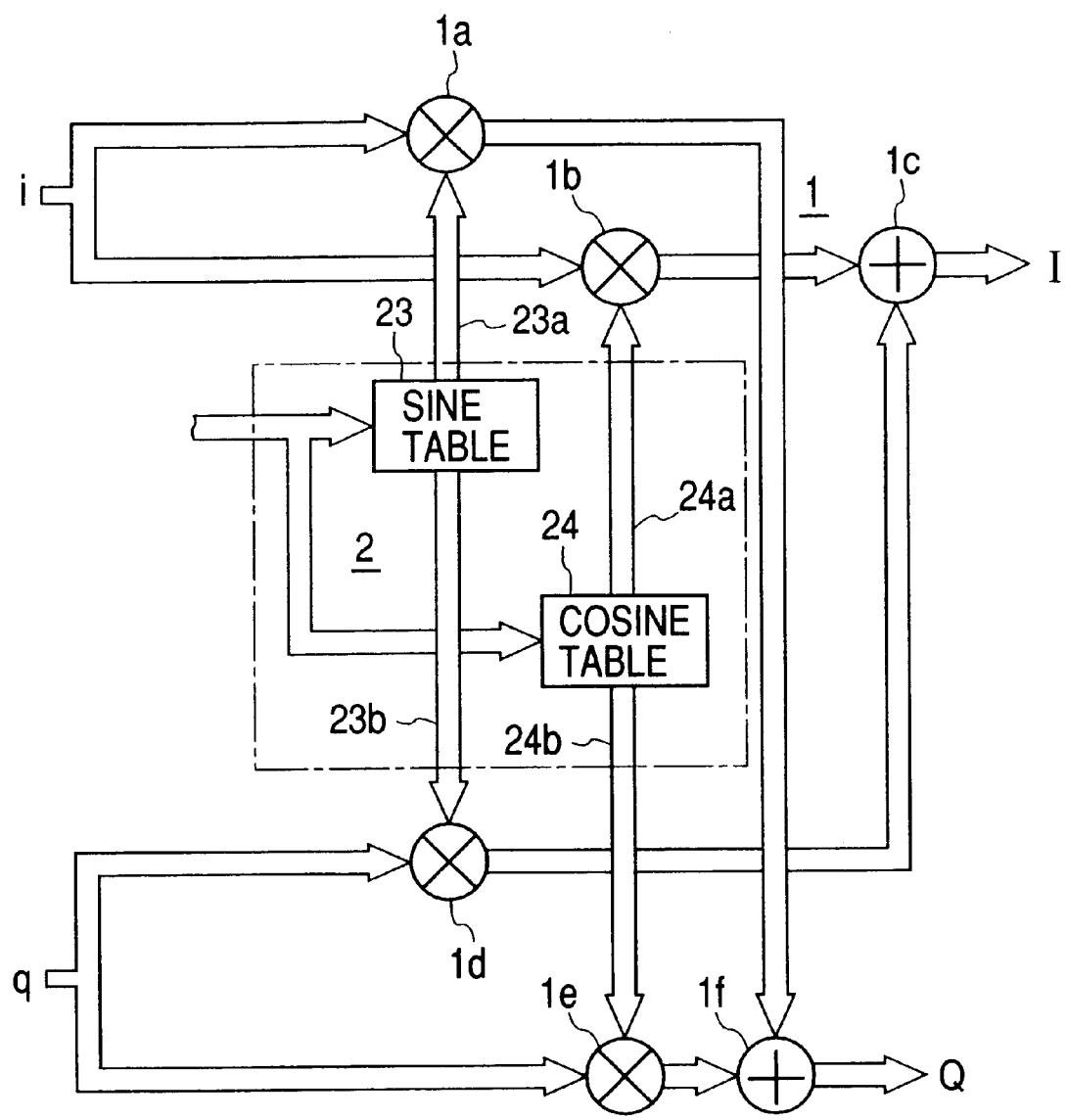
FIG. 3 is a block diagram showing the configuration of an arithmetic circuit as well as numerical control oscillator in the digital demodulator according to the embodiment of the present invention.

The numerical control oscillator 2 comprises, as shown in FIG. 3, a sine wave table 23 outputting the sine wave data 23a and 23b having mutually opposite polarity and a cosine wave table 24 outputting the cosine wave data 24a and 24b, and based on outputs from the AFC circuit 9 outputs sine wave data 23a and 23b as well as cosine wave data 24a and 24b each having mutually opposite polarity and in cooperation with the AFC circuit 9 outputs sine wave signals as well as cosine wave signals having mutually opposite polarity substantially forming the reproduced carrier.

The arithmetic circuit 1 comprises, as shown in FIG. 3, a multiplier 1a multiplying the baseband signals i, which have been quasi-synchronously detected in the I axis, by the sine wave data 23a, a multiplier 1b multiplying the baseband signals i by the cosine data 24a, a multiplier 1d multiplying baseband signals q, which have been quasi-synchronously detected in the Q axis, by the sine wave data 23b having an opposite polarity, a multiplier 1e multiplying the baseband signals q by the cosine wave data 24b, an adder 1c adding an output of the multiplier 1b to an output of the multiplier 1d and outputs the result as a baseband signal 1, and an adder 1f adding an output of the multiplier 1a to an output of the multiplier 1e and outputs the result as a baseband signal Q, and in receipt of the output from the numerical control oscillator 2, causes the baseband signals i and q to undergo frequency synchronization, and sends out respectively to the rolloff filter 3 the baseband signals I and Q being frequency-synchronized outputs.

The frame synchronization timing circuit 4 receives the baseband signals ID and QD outputted from the rolloff filter 3, and sends out the TMCC pattern to the transmission mode judging circuit 5. Based on the decoded results of the TMCC patterns, the transmission mode judging circuit 5 sends out the two-bit transmission mode signals to the frame synchronization timing circuit 4, corresponding to 8PSK signals (demodulated outputs having undergone demodulation on the 8PSK modulated waves are indicated as 8PSK signals) being high hierarchical signals, QPSK signals (demodulated outputs having undergone demodulation on the QPSK modulated waves are indicated as QPSK signals) being low hierarchical signals, and BPSK signals (demodulated outputs having undergone demodulation on the BPSK modulated waves are indicated as BPSK signals).

The frame synchronization timing circuit 4 receives the baseband signals ID and QD and detects the frame synchronization pattern to output the frame synchronization signals FSYNC to the AFC circuit 9 and to cause the AFC circuit 9 to perform an AFC operation on a frame-by-frame basis, and in receipt of the transmission mode signals being outputted from the transmission mode judging circuit 5, outputs the signal Rs shown in FIG. 2(b) in synchronism with the frame synchronization pattern leader, and implements processing on the signal A1 shown in FIG. 2(c) having a high potential during the BPSK signal period, the frame synchronization pattern interval, the superframe discrimination pattern interval, and the burst symbol signal interval and the signal A0 shown in FIG. 2(d) having a high potential during the QPSK signal period, and outputs the signal As shown in FIG. 2(e) having high potential during the frame synchronization pattern period, the signal Bs shown in FIG. 2(f) having high potential during the burst symbol signal period, and the signal SF shown in FIG. 2(g) having high potential during the superframe discrimination pattern period.

Next, the superframe discrimination pattern will be described. FIG. 4(a) is an explanatory diagram of the superframe discrimination pattern, and $W_1$ indicates a frame synchronization pattern, which is same for all frames. In FIG. 4(a), the patterns $W_2$ and $W_3$ indicate the superframe discrimination pattern, and the frame synchronization pattern as well as the superframe discrimination pattern are extracted from each frame for description. For the leading frame, the superframe discrimination pattern is the $W_2$ pattern, and for the superframe discrimination patterns on all of seven frames from the second frame through the eighth frame are $W_3$, and the pattern $W_3$ is formed as an inverted pattern of $W_2$.

The frame synchronization timing circuit 4 outputs, as shown in FIG. 4(b), the superframe discrimination pattern discriminating signals with a low potential during the superframe discrimination pattern $W_2$ period of the leading frame, being the signals to discriminate the superframe discrimination pattern being a high potential during the superframe discrimination pattern $W_3$ period of the succeeding seven frames.

The known-pattern signal generating circuit 6 comprises the frame synchronization pattern generating circuit 61, the superframe discrimination pattern generating circuit 62, the burst symbol pattern generating circuit 63, the exclusive OR circuit 64, the inverters 65 and 66, and the OR gate circuit 67, and outputs from the OR gate circuit 67 the known-pattern signals to the carrier-reproducing loop filter 8 as the enabling signals.

The frame synchronization pattern generating circuit 61 is reset by the signal Rs, and receives the signal As, that is, the signal during the frame synchronization pattern period as an enabling signal, and sends out a signal configuring the frame synchronization pattern in synchronism with the bit clock signals. This signal is inverted in the inverter 65, and the inverted signals are sent out to the carrier-reproducing loop filter 8 as enabling signals via the OR gate circuit 67. For example, at a high potential, enabling will be instructed.

The superframe discrimination pattern generating circuit 62 is reset by the signal Rs, and receives the signal SF, that is, the signal during the superframe discrimination pattern period as an enabling signal, and sends out in succession to the exclusive OR circuit 64 the superframe discrimination pattern $W_2$ configuring the leading frame in synchronism with the bit clock signals. This signal undergoes an exclusive OR operation with the superframe discrimination pattern discriminating signals outputted from the frame synchronization timing circuit 4, and undergoes inversion and is sent out to the OR gate circuit 67.

Accordingly, by the superframe discrimination pattern discriminating signals outputted from the superframe discrimination pattern generating circuit 62, the superframe discrimination pattern of $W_2$ for the leading frame and the pattern $W_3$, which has undergone inversion on the pattern $W_2$ for the succeeding seven frames, are sent out from the exclusive OR circuit 64. As a result of this, from the exclusive OR circuit 64, the signals $W_2$, $W_3$, $W_3$, $W_3$, $W_3$, $W_3$, $W_3$, and $W_3$ of the superframe discrimination pattern as shown in FIG. 4(a) are sent out to the carrier-reproducing loop filter 8 as the enabling signals on a frame-by-frame basis from the leading frame through the eighth frame via the OR gate circuit 67. For example, at a high potential, enabling will be instructed.

The burst symbol pattern generating circuit 63 is reset by the signal Rs, and receives the signal Bs, that is, the signal during the burst symbol pattern period as an enabling signal, and sends out in succession in synchronism with the bit clock signals to the inverter 66 the burst symbol signals, which undergo inversion in the inverter 66 to be sent out. This inverted signals are sent out as enabling signals via the OR gate circuit 67. For example, at a high potential, enabling will be instructed.

As a result of this, the known-pattern signal generating circuit 6 will enable the carrier-reproducing loop filter 8 during the period of high potential of the inverted signal of the frame synchronization pattern, the inverted signal of the superframe discrimination pattern shown in FIG. 4(a) corresponding to the frame numbers on a frame-by-frame basis, and the inverted signal of the burst symbol signals.

In receipt of the baseband signals ID and QD outputted from the rolloff filter 3, the carrier-reproducing phase error detecting circuit 7 detects the phase error between the phase of one of the phase baseband signals ID and QD and its reference phase. Herein, the phase base signals ID and QD are obtained from the signal point position based on the baseband signals ID and QD with reference to the carrier-reproducing phase error table, and sends out the phase error voltage values based on the phase error.

Figure 5A:
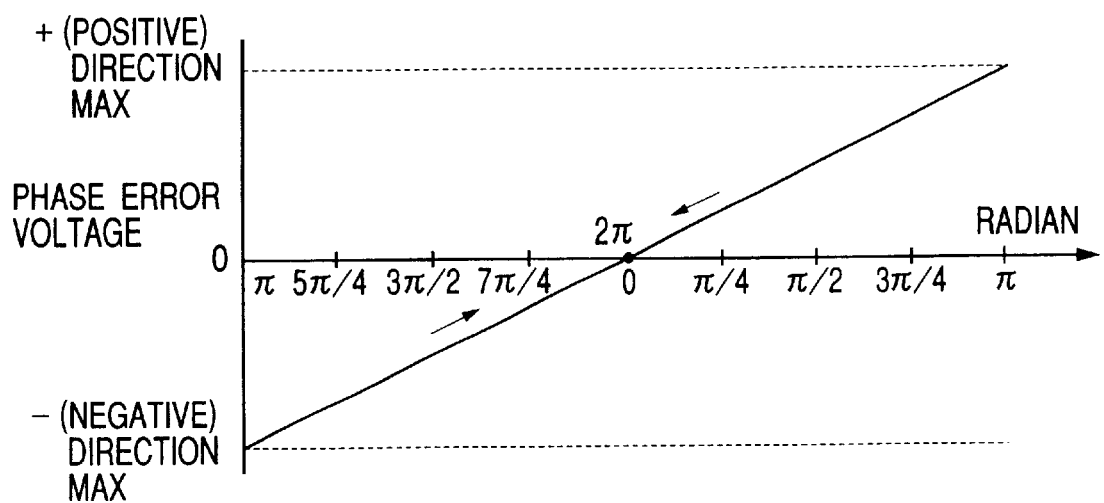
FIGS. 5(a) and 5(b) are an explanatory graphs on a phase error table in the digital demodulator according to the embodiment of the present invention.

Further in particular, the carrier-reproducing phase error detecting circuit 7 comprises the carrier-reproducing phase error table shown in FIG. 5(a) having the phase convergence point (0(2π) radian) of one of the reference phases of the baseband signals ID and QD, and obtains the phases from the signal point positions of the baseband signals ID and QD, and the phase error voltage based on the phase error between said phase and one of the reference phases is obtained from the carrier-reproducing phase error table, and is sent to the carrier-reproducing loop filter 8.

Figure 5B:
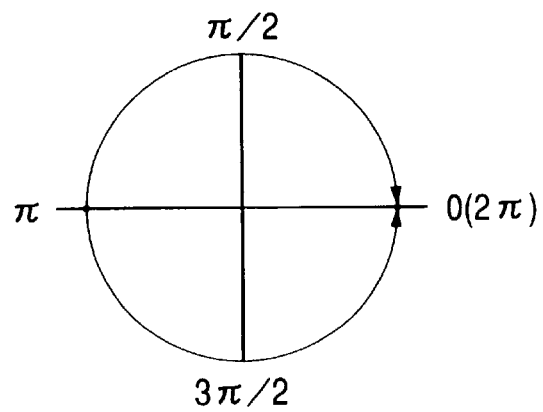

Then, when phases obtained from the signal point position of the baseband signals ID and QD inputted to the carrier-reproducing phase error detecting circuit 7 are those which are in an increasing direction from not less than π radian to not more than 0 (2π) radian, a negative phase error voltage value shown in FIGS. 5(a) and 5(b) is outputted and phases are those which are in a decreasing direction from less than π radian to 0 (2π) radian, a positive phase error voltage value shown in FIGS. 5(a) and 5(b) is inputted, and under control of the AFC circuit 9 (carrier-generating loop) to which this phase error voltage is supplied, the phases having been obtained from the signal point positions undergo as shown in FIG. 5(b) convergence to 0 (2π) radian. In this case, the phase error voltage value takes maximum value in the+ (positive) direction and maximum value in the − (negative) direction when the phase is π radian.

The phase error voltage having been outputted from the carrier-reproducing phase error detecting circuit 7 based on the phases having been obtained from the signal point positions of the baseband signals ID and QD is supplied to the carrier-reproducing loop filter 8 comprising a digital low-pass filter, and the phase error voltage is smoothed. In this case, the signals to be outputted from the known-pattern signal generating circuit 6 are supplied to the carrier-reproducing loop filter 8 as enabling signals (CRFLGP), the carrier reproducing loop filter 8 performs a filter operation only during the period of the bit "0" (a low potential) for the period of the frame synchronization pattern, the period of the superframe discrimination pattern, and the period of the burst symbol signal. During the period of bit "1" (high potential) where the bit "0" has been inverted, the carrier-reproducing loop filter 8 is enabled as having been described so far.

During the period of the bit "1" for the period of the frame synchronization pattern, the period of the superframe discrimination pattern, the period of the burst symbol signal, the period of the BPSK signal of the primary signal, the period of the QPSK signal, and the period of the 8PSK signal, the carrier-reproducing loop filter 8 is disenabled to halt an operation and is caused to keep the filter output at the time when the filer has operated just before the halting. The output from the carrier-reproducing loop filter 8 is supplied as the tuning voltage of carrier-reproducing loop to the AFC circuit 9.

On the other hand, the phase reference point of the signal point positions of the baseband signals ID and QD outputted from the rolloff filter 3 is two of 0 ($2\pi$) radian, or $\pi$ radian. However, the phase reference point of the carrier-reproducing phase error detecting table which the carrier-reproducing phase error detecting circuit 7 comprises is 0 ($2\pi$) radian. Accordingly, the phase error voltage based on a phase error between phases of signal point positions of the baseband signals ID and QD outputted from the rolloff filter 3 and the reference point 0 ($2\pi$) radian is obtained, but the phase error voltage based on a phase error between phases of signal point positions of the baseband signals ID and QD and the reference point $\pi$ radian is not obtained.

Nevertheless, if the baseband signal with the phase reference point of the signal point position being in the value of $\pi$ radian is supplied to the carrier-reproducing phase error detecting circuit 7, or if the baseband signal based on the BPSK signal, the QPSK signal, and the 8PSK signal of the primary signal is supplied to the carrier-reproducing phase error detecting circuit 7, in these cases, no inconvenience will take place since the carrier-reproducing loop filter 8 will not be enabled as described above.

Operation of the digital demodulator according to an embodiment of the present invention described above will be described.

In a BS digital broadcasting receiver, desired signals within a generally designated channel undergo scanning with a scanning operation of the AFC circuit 10, and undergo operation so that the carrier is captured. In the digital demodulator according to an embodiment of the present invention, in receipt of the desired signals, which undergo orthogonal demodulation with the quasi-synchronous detecting system, the demodulation baseband signals i and q, which are supplied to the arithmetic circuit 1, as well as output data from the numerical controlling oscillator 2 undergo an arithmetic operation, and are converted into the baseband signals I and Q.

The baseband signals I and Q are supplied to the rolloff filter 3, and the baseband signals ID and QD via the rolloff filter 3 are supplied to the carrier-reproducing phase error detecting circuit 7, and the phase error voltage for carrier reproduction based on the phases obtained from the signal point positions based on the baseband signals ID and QD is obtained, and then the phase error voltage is smoothed by the carrier-reproducing loop filter 8 and is supplied to the AFC circuit 9 as the tuning voltage of the carrier-reproducing loop, and the output of the AFC circuit 9 is given to the numerical controlling oscillator 2, and the carrier frequency is controlled so that the phase error voltage becomes 0, and thus carrier reproduction is implemented.

On the other hand, the baseband signals ID and QD are supplied to the frame synchronization timing circuit 4, and the frame synchronization pattern is detected, and thus the frame synchronization is captured to establish the frame timing, then time-series positions respectively of the frame synchronization pattern, the TMCC pattern, the superframe discrimination pattern, and the burst symbol signal are clarified, and the TMCC pattern is sent out to the transmission mode judging circuit 5 to undergo decoding, and in receipt of the transmission mode signal outputted from the transmission mode judging circuit 5, the frame synchronization timing circuit 4 sends out the signals Rs, As, which is generated from A1 and A0, Bs and SF.

In receipt of the signals Rs, As, Bs, SF, and the superframe discrimination pattern signals sent out from the frame synchronization timing circuit 4, the signals with high potential based on the reception phase point in which the reception phase points on a time unit basis have been respectively recognized from the reception phases as well as the positions in terms of time based on the inverted signals of the frame synchronization pattern signals, the superframe discrimination pattern signals, and the burst symbol signals, and the reception phase point has been recognized is sent out from the known-pattern signal generating circuit 6 to the carrier-reproducing loop filter 8 as the enabling signals.

And on the other hand, in the carrier-reproducing phase error detecting circuit 7 which is supplied with the baseband signals ID and QD outputted from the rolloff filter 3, the phase error voltage based on the difference between the phase obtained from the signal point position of the baseband signals ID and QD the convergence point 0 ($2\pi$) radian of the phase error table is obtained from the phase error table shown in FIG. 5, and is sent out to the carrier-reproducing loop filter 8.

Under this condition, from the known-pattern signal generating circuit 6, the inverted signal of the frame synchronization pattern, the inverted signal of the superframe discrimination pattern, and the inverted signal of the burst symbol signal are supplied to the carrier-reproducing loop filter 8 as the enabling signals (CRFLGP), and during the period for high potential of the enabling signals (CRFLGP), the phase error voltage is smoothed with the carrier-reproducing loop filter 8, and the output from the carrier-reproducing loop filter 8 is sent out to the AFC circuit 9, and based on the output from the carrier-reproducing loop filter 8, frequency control of the carrier is implemented, and carrier reproduction by burst reception is implemented.

For the period when the inverted signal of the frame synchronization pattern, the inverted signal of the superframe discrimination pattern, and the inverted signal of the burst symbol signal remains in a low potential, for the period of the primary signal BPSK signal, for the period of the QPSK signal, and for the period of 8PSK signal, the enabling signal (CRFLGP) remains in a low potential, and for the period of a low potential, the carrier-reproducing loop filter 8 is disenabled to halt an operation and is caused to keep the filter output status at the time when the filer has operated just before the halting, and carrier reproduction is implemented.

As described above, in the digital demodulator according to an embodiment of the present invention, based on the phase error voltage obtained by the phase error table with one convergence point, carrier reproduction is implemented, and since the phase point of the reception signal converges into one phase point, the reception signal undergoes absolute phasing and no absolute phasing circuit will be needed. As a result of this, a required area when the digital demodulator undergoes circuitry integration will be made less.

Incidentally, also when the low potential signal among the inverted signal of the frame synchronization pattern, the inverted signals of the superframe discrimination pattern as well as the inverted signals of the burst symbol signals, and the baseband signals ID and QD based on the BPSK signal, QPSK signal, and the 8PSK signal of the primary signal, the QPSK signal are supplied to the carrier-reproducing phase error detecting circuit 7, the phase error voltage is detected with the carrier-reproducing phase error table (see FIG. 5) of the reference point of 0 ($2\pi$), but in this case, the enabling signal (CRFLCP) remains in a low potential, and since the carrier-reproducing loop filter 8 is not enabled, giving rise to no problems as described before. In addition, as for a portion of the burst symbols, in some cases, some data are sent out, but in that case, the interval where no data are sent out will be used.

Incidentally, in a mode of the above-described embodiment, comprising in the carrier-reproducing phase error detecting circuit 7 a phase error table with the phase convergence point being disposed at $\pi$ radian instead of the phase convergence point of 0 ($2\pi$) radian to detect the phase error voltage based on the phase error of the signal point phase based on the demodulation baseband signals ID and QD, and being configured so that in the known-pattern signal generating circuit 6 the inverters 65 and 66 are omitted and the output from the exclusive OR circuit 64 is outputted without undergoing inversion, the carrier-reproducing loop filter 8 may be arranged to be enabled with the bit "0" of the output from the known-pattern signal generating circuit 6.

Industrial Applicability

As having been described so far, according to the digital demodulator according to the present invention, at carrier-reproducing phase error detection for the period of reception of the known-pattern BPSK signal, the phase error table with one convergence point is used to detect the phase error based on the reception phase of the reception signal, and the carrier reproduction is implemented based on the phase error, and thus, the reception signal undergoes absolute phasing and no absolute phasing circuit will be needed, which gives rise to an advantage that the required area when the digital demodulator undergoes circuitry integration will be made less.

What is claimed is:

1. A digital demodulator of a receiver for digital broadcasting which receives and transmits digital modulated waves created by time-base-multiplexing waves modulated by a plurality of modulation systems, comprising:

known-pattern signal generating means for generating in synchronism with known-pattern signals in received digital modulated waves the same known-pattern signal as a known-pattern BPSK signal in the received digital modulated waves;

carrier-reproducing phase error detecting means, which comprises a phase error table having one reference phase as a convergence point between two reference phases of signal point positions of BPSK demodulation baseband signals, for sending out a phase error output based on a phase error between the phase obtained from the signal point position of the demodulation baseband signals and the phase convergence point; and a carrier-reproducing loop filter which is controlled for enablement based on the known-pattern signals outputted from the known-pattern signal generating means and smoothes the phase error outputs during an enabling period, wherein carrier reproduction is implemented by controlling the frequency of a reproduced carrier so that, based on the output of the carrier-reproducing loop filter, the phase of said signal point position coincides with the phase convergence point.

2. The digital demodulator according to claim 1, characterized in that the carrier-reproducing loop filter is controlled to enablement for the period of low potential of the known-pattern signals outputted from the known-pattern signal generating means.

* * * * *